United States Patent [19]

Song et al.

[11] 3,920,622

[45] Nov. 18, 1975

[54] POLYMERS COMPRISING VINYL AROMATIC, $C_2$ TO $C_8$ OLEFIN ARE USEFUL AS LUBRICANT ADDITIVES

[75] Inventors: Won R. Song, Maplewood; Norman Jacobson, East Brunswick, both of N.J.

[73] Assignee: Exxon Research & Engineering Co., Linden, N.J.

[22] Filed: Dec. 3, 1973

[21] Appl. No.: 421,413

Related U.S. Application Data

[62] Division of Ser. No. 267,211, June 28, 1972, Pat. No. 3,790,483.

[52] U.S. Cl........... 260/80.78; 260/96 HY; 260/88.2
[51] Int. Cl.²................ C08F 210/00; C08F 212/00
[58] Field of Search......................... 260/80.78, 88.2

[56] References Cited
UNITED STATES PATENTS 2,910,458  10/1959  Goering et al. .................... 260/80.5
3,157,624  11/1964  de Vries et al. ................... 260/88.2

OTHER PUBLICATIONS

Nakajima in "Polymer Molecular Weight Methods" —Advances in Chemistry Series 125, American Chemical Society, Washington, D.C., 1973, pp. 98–107.

*Primary Examiner*—Joseph L. Schofer
*Assistant Examiner*—A. L. Clingman
*Attorney, Agent, or Firm*—C. A. Cohen; Frank T. Johmann

[57] ABSTRACT

An oil-soluble terpolymer, useful as a viscosity index improver and pour point depressant for lubricating oils, is made by a Ziegler-Natta synthesis, preferably hydrogen moderated, from monomers comprising 2 to 50 mole percent of a vinyl aromatic hydrocarbon; from 1 to 49 mole percent of a $C_2$–$C_8$ straight-chain α-olefin; and 10 to 97 mole percent of a substantially linear $C_{12}$–$C_{20}$ α-olefin having not less than 9 unsubstituted methylene radicals in a straight chain following the olefinic carbon atoms. The terpolymer is amorphous in structure as determined by X-Ray and differential thermal analyses, is essentially free of olefinic unsaturation and has a number average molecular weight equal to or greater than 10,000.

2 Claims, No Drawings

POLYMERS COMPRISING VINYL AROMATIC, $C_2$ TO $C_8$ OLEFIN ARE USEFUL AS LUBRICANT ADDITIVES

CROSS-REFERENCE TO RELATED APPLICATION

This application is a division of Ser. No. 267,211, filed June 28, 1972, and now issued as U.S. Pat. No. 3,790,483.

BACKGROUND OF THE INVENTION

1. Field of the Invention

This invention relates to lubricating oil compositions comprising a major proportion of a lubricating oil and a minor proportion of an oil-soluble hydrocarbon polymer. More particularly, the invention is concerned with a polymeric additive which possesses pour point depressing and viscosity index improving properties when admixed with lubricating oil and has good oxidative and thermal stability.

The polymer, e.g. terpolymer, can be prepared by a Ziegler-Natta synthesis, preferably hydrogen moderated, from monomers comprising: a vinyl aromatic hydrocarbon having a total of 8 to 20 carbon atoms; a $C_2$–$C_8$ straight-chain alpha-olefin; and a substantially linear $C_{12}$–$C_{20}$ alpha-olefin having not less than 9 unsubstituted methylene radicals in a straight chain, following the olefinic carbon atoms.

Structurally, the terpolymer may be illustrated as a randomly distributed addition polymer having the following monomer moieties:

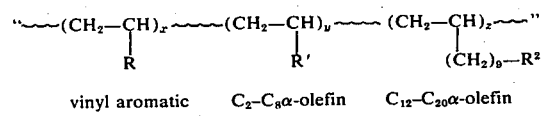

wherein R is a mono or polynuclear aryl, or alkyl substituted arylene, radical having a total of from 6 to 18 carbon atoms; $R^1$ is selected from hydrogen, a methyl radical or a straight-chain $C_2$ to $C_6$ alkyl radical; $R^2$ is a straight-chain or methyl substituted straight-chain alkyl radical of from 1 to 9 carbon atoms and $x$, $y$ and $z$ are integers in the range of from 1 to about 50. The polymer is amorphous, i.e., shows essentially a zero crystalline content when analyzed by the method of Ver Strate and Wilchinsky: Journ. Polymer Science 9, 127, (1971).

2. Description of the Prior Art

U.S. Pat. No. 3,157,624 discloses the preparation of a copolymer of one mole of styrene, or an alkyl substituted styrene, with from 4 to 14 moles of a $C_{10}$–$C_{20}$ straight-chain alpha-olefin in a molecular weight range of 100,000 to 1,000,000 using a hydrogen moderated Ziegler-Natta synthesis. While this prior art polymer performs satisfactorily when used alone, problems of compatibility arise when it is admixed with other polymers such as the ethylene-higher olefin, e.g. propylene, copolymers described for example in U.S. Pat. Nos. 3,522,180 and 3,551,336. Ethylene-propylene copolymers have become commercially available as lubricating oil V.I. improvers because of their low cost and good effectiveness. In general, these ethylene-propylene copolymers comprise about 40 to 83 wt. % ethylene, having a weight average molecular weight in the range of 10,000 to 200,000; a $M_w/M_n$ ratio preferably less than about 7.0, e.g. 4.0, and a degree of crystallinity of less than 25%. One problem with these ethylene-propylene copolymers has been compatibility with other polymeric additives, particularly pour point depressants.

If stryrene-α-olefin copolymers, such as those of U.S. Pat. No. 3,157,624, is mixed with the ethylene-propylene copolymers, such as those of U.S. Pat. Nos. 3,522,180 and 3,551,336, in oil and stored at elevated temperatures, the styrene-α-olefin copolymer tends to cause the ethylene-propylene copolymers, especially those having a high ethylene content or a significant crystalline content, to drop out of solution. However, the polymer of the instant invention is compatible with the ethylene-propylene copolymers described above.

SUMMARY OF THE INVENTION

Oil-soluble, amorphous terpolymers particularly useful as viscosity index improvers and pour point depressants when compounded in lubricating oils in a minor amount, e.g. 0.5 to 10.0, usually 0.5 to 5.0 wt. %, based on the total composition, have been prepared from monomers comprising 2 to 50, preferably 5 to 45, mole % of a nuclear substituted vinyl aromatic hydro-carbon having a total of 8 to 20 carbon atoms; 1 to 49, preferably 5 to 40, mole % of a $C_2$ to $C_8$ straight-chain alpha-olefin; and 10 to 97, preferably 20 to 80, mole % of a $C_{12}$ to $C_{20}$ substantially linear alpha-olefin having not less than 9 unsubstituted methylene radicals in a straight chain following the olefinic carbon atoms by means of Ziegler-Natta catalysts. A moderator, such as hydrogen, is used in the polymerization to control and achieve the desired molecular weight. The polymers of this invention are further characterized by a random distribution of monomer moieties in the polymer chain, substantial absence of either olefinic unsaturation or crystallinity, and a number average molecular weight in the range of 10,000 to 200,000, e.g. 20,000 to 120,000.

In contrast to styrene-olefin polymers of the prior art, the terpolymers of the instant invention are compatible with other polymeric hydrocarbon viscosity index improvers, especially ethylene-α-olefin copolymers having a high ethylene content, e.g. 55 to 80 wt. % ethylene, or a significant degree of crystallinity, e.g. 3 to 25%, which may be present in a minor amount, e.g. 0.5 to 10 wt. %. The compatibility is most marked when lubricant compositions containing both types of viscosity index improvers are stored at elevated temperatures for an extended period of time.

DESCRIPTION OF THE PREFERRED EMBODIMENTS

The production of high polymers from olefins using Ziegler-Natta catalysts is well-known in the art and has been recently reviewed by G. Natta et al. in "Polymer Chemistry of Synthetic Elastomers" Chapter 7, p. 679 ff, edited by Kennedy & Tornqvist, 1969, Interscience, New York.

The catalyst compositions consist of a transition metal compound from Groups IVb, Vb and VIb of the Periodic Table of the Elements, particularly compounds of titanium and vanadium, which compounds are designated as primary catalysts, and organo-metallic reducing compounds from Groups IIa, IIb and IIId, particularly organoaluminum compounds which are designated as cocatalysts.

Monomers useful for the practice of this invention comprise:

1. Nuclear substituted vinyl mono or polynuclear aromatic compounds having the general formula $CH_2=CH-R$ wherein R is selected from the group consisting of $C_6$ to $C_{18}$ mono or polynuclear aryl, or alkyl substituted, arylene radicals. Examaples of suitable vinyl aromatic compounds include: styrene, 4-methyl styrene, 4-ethyl styrene, 4-n-propyl styrene, 4-isopropyl styrene, 4-n-butyl styrene, 4-tert.-butyl styrene, 1-vinyl-4-methyl naphthalene, 1-vinyl-4-n-hexyl naphthalene, etc. 2. Straight-chain $C_2$ or $C_8$ alpha-olefins having the general formula $CH_2=CH-R^1$ wherein $R^1$ is selected from the group consisting of hydrogen, a methyl radical or a straight chain $C_2$ to $C_6$ alkyl radical. Suitable olefins are: ethylene, propylene, butene-1, pentene-1, hexene-1, heptene-1, and octene-1.

3. Substantially linear, $C_{12}$ to $C_{20}$ alpha olefins having the general formula $CH_2=CH-(CH_2)_9-R^2$ wherein $R^2$ is selected from the group consisting of a methyl radical, a $C_2$ to $C_9$ straight-chain alkyl radical and a $C_2$ to $C_9$ alkyl radical having side-chain branching no longger than a methyl radical. Suitable olefins include dodecene-1, tridecene-1, tetradecene-1, pentadecene-1, hexadecene-1, heptadecene-1, octadecene-1, nonadecene-1, eicosene-1, 13,13-dimethyl tetradecene-1 and 12,12-dimethyl dimethyl 1. Mixtures of two or more of the above classes of monomers can be used, e.g. two $C_{12-20}$ alpha olefins, etc.

While all of the above monomers are suitable for the practice of this invention, most preferred for reasons of economy are styrene, hexene-1 and tetradecene-1. The advantage of adding a lower olefin to the higher olefins in producing terpolymers with styrene, compared to the copolymers of the prior art, is illustrated, in the results of the ten experiments given in Table I.

Experiments 1 to 10 — Experiments 1 to 3 inclusive are illustrative of the products disclosed in the prior art. Experiments 4 to 10 illustrate the products obtained in accordance with this invention.

Freshly redistilled monomers, maintained under oxygen-free nitrogen were used in all the experiments. Toluene, used as a solvent in the synthesis of the polymers, was dried azeo-tropically and also kept under nitrogen. The primary catalyst used in all of the experiments was a product commercially available from Staffer Chemical Company as AA catalyst. The AA catalyst has the formula $(TiCl_3)_3 \cdot AlCl_3$ and is made by the reduction of 3 moles of $TiCl_4$ with one mole of aluminum. It is a finely ground, or milled, purple powder, has a molecular weight of 596.15, sublimes at 225°C. and shows a close packed hexagonal cubic crystal structure by X-Ray analysis. The co-catalyst used in all of the experiments was aluminum tri-n-propyl $Al(n-C_3H_7)_3$ diluent The same quantities of catalyst, cocatalyst, and dilulent was used in all of the experiments.

As a further illustration of these experiments, Experiment No. 8 (show in Table I) which is typical, is now described in detail. A reaction flask fitted with a stirrer, thermometer, reflux condenser, hydrogen inlet tube, dropping funnel vented back to the flask and heating mantle was thoroughly dried and transferred to a drybox in which was maintained an oxygen-free atmosphere of dry nitrogen. To the flask was added 0.84 grams of the AA catalyst, 0.81 ml. of the aluminum tri-propyl co-catalyst and 120 ml. of dry, purified toluene. While a slow stream of hydrogen was bubbled through the mixture, the flask contents were heated to 70°C. and maintained at this temperature for ½ hour to age the catalyst mixture. At the end of the half-hour, one-third (58 ml.) of a monomer solution previously added to the dropping funnel, consisting of 58.8 grams (0.30 moles) of tetradecene-1, 8.48 grams (0.10 moles) of hexene-1 and 10.48 grams (0.10 moles) of styrene diluted to 174 ml. with purified toluene, was added with stirring. A second 58 ml. was added at the end of one hour and the last portion was added at the end of 1½ hours. When the monomer addition was complete, stirring, heating at 70°C. and hydrogen addition was continued for an additional 2 hours. The catalyst was inactivated by the addition of anhydrous isopropyl alcohol in heptane and the polymer precipitated by the addition to a large volume of methanol. The filtered polymer was separated from any polystyrene by resolution in hexane, filtration from insolubles and repreciptation with methanol. The dried polymer weighed 45.4 gms. representing a yield of 58.4 wt. % based on the weight of the starting monomers. The styrene content of the polymer was determined by nuclear magnetic resonance (NMR) analysis.

Portions of the polymers of Experiments 1 to 10 were dissolved at the concentrations and in the oils shown in Table I and the viscosity index, pour point and sonic breakdown determined. In all instances, the polymers of the instant invention (Experiments 4 to 10), containing lower olefins yielded lower pour points and/or suffered less sonic breakdown than the products of the prior art (Experiments 1 to 3), made only with higher olefins. The shear stability of a polymer in oil as measured by sonic breakdown is well known in the lubricant art and has been described, for example, in U.S. Pat. No. 3,157,624.

The specific polymers prepared and their test results are summarized in Table I, which follows:

TABLE I

SYNTHESIS AND INSPECTIONS OF STYRENE-OLEFIN POLYMERS[c]

| Exper. No. | Moles α— $C_{14}^=$ | Monomer in Feed Mols. Styrene | Mols.α— $C_6^=$ | Yield of Polymer Wt. % | Mol. % Styrene in Polymer by NMR | Int. Visc.[c] |
|---|---|---|---|---|---|---|
| 1 | 0.4 | 0.1 | none | 54.3 | — | 0.37 |
| 2 | 0.3 | 0.2 | none | 50.1 | — | 0.30 |
| 3 | 0.45 | 0.05 | none | 52.9 | — | 0.34 |
| 4 | 0.26 | 0.02 | 0.01 | 61.1 | — | 0.27 |
| 5 | 0.45 | 0.025 | 0.025 | 84.5 | — | 0.35 |
| 6 | 0.40 | 0.05 | 0.05 | 70.9 | — | 0.27 |
| 7 | 0.425 | 0.05 | 0.05 | 69.3 | 4.4 | 0.28 |
| 8 | 0.30 | 0.10 | 0.10 | 58.4 | 10.0 | 0.25 |
| 9 | 0.20 | 0.20 | 0.10 | 63.3 | 22.0 | 0.24 |
| 10 | 0.10 | 0.20 | 0.20 | 73.3 | — | 0.24 |

| | | | Oil Blend Inspections | | | |
|---|---|---|---|---|---|---|
| Wt. % Polymer in Blend[a] | Kin. Visc. cs. at 210°F. | Kin. Visc. cs. at 100°F. | Viscosity Index | Visc. at 0°F. Poise | % Visc. Loss by Sonic Breakdown | Pour Point, °F.[b] |
| 2.02 | 12.22 | 81.63 | 134.5 | 19.2 | 51.0 | −10 |

TABLE I-continued

SYNTHESIS AND INSPECTIONS OF STYRENE-OLEFIN POLYMERS[a]

| Exper. No. | Moles α— $C_{14}^=$ | Monomer in Feed Mols. Styrene | Mols. α— $C_6^=$ | Yield of Polymer Wt. % | Mol. % Styrene in Polymer by NMR | Int. Visc.[c] |
|---|---|---|---|---|---|---|
| 2.62 | 12.26 | 78.05 | 138.3 | 19.8 | 48.4 | −10 |
| 2.30 | 12.38 | 83.13 | 134.5 | 19.5 | 52.5 | −10 |
| 2.82 | 12.20 | 81.42 | 134.6 | 19.9 | 42.6 | −10 |
| 2.27 | 12.51 | 83.25 | 135.2 | 19.2 | 52.6 | −15 |
| 3.00 | 12.52 | 85.10 | 133.2 | 19.7 | 42.5 | −20 |
| 2.70 | 12.28 | 82.25 | 123.2 | 19.7 | 44.2 | −15 |
| 3.08 | 12.38 | 83.85 | 133.2 | 20.9 | 35.1 | <−30 |
| 3.15 | 12.21 | 82.60 | 133.8 | 21.6 | 32.8 | −25 |
| 3.22 | 12.23 | 83.00 | 131.8 | 21.9 | 31.9 | −25 |

[a]In solvent extracted neutral mineral lubricating oil. visc. at 210°F. = 6.2 cs; V.I. 109, ASTM Pour Point = 0°F.
[b]ASTM Pour Point of 0.1 wt. % in mineral lubricating oil having visc. at 210°of 44.0 SUS, 0°F. Pour Point.
[c]Intrinsic Viscosity calculated from the data of the first and second columns of Table I, namely the Kin. Visc. cs. at 210°F, at the Wt. % Polymer noted, using the solvent neutral oil of footnote (a) the formula $[\eta] = (2\eta_{sp} - 2 \ln \eta rel)^5/C$ where, ηsp. = ηobs. − ηsolvent/ηsolvent, ηrel = ηobs./ηsolvent, and c = polymer concentration in gm./100 ml. solvent. These viscosities show that the polymers have number average molecular weights between about 50,000 and 100,000 based upon general experience with related polymers.

Experiment 11 - The product of Experiment 9 as one embodiment of this invention was compared with the product of experiment 2 as a representative of the prior art styrene-higher olefin polymers and with two commercial viscosity index improvers in a Laboratory Multiple Oxidation Test (LMOT). In this test, which measures the resistance of a lubricant to oxidation and sludge formation, a 400 gram sample of the compound oil to which has been added 2.5 grams of iron filings, a 19 inch length of No. 14 gauge copper wire and a sanded aluminum strip measuring ¼ inch × 12 inches × 1/16 inch is heated to either 325°F. for 5 days or 300°F. for 7 days while a stream of air is bubbled through the oil at a rate of 25 ml. per minuted. Breakdown of the oil is estimated by meaans of a blotter test, total acid number (TAN) at the end of the test, the presence of sludge in the oil and the formation of a varnish film on the aluminum strip.

For test purposes, the polymers were compounded into fully formulated automotive automatic transmission fluids in a solvent extracted mineral lubricating neutral oil having a viscosity at 210°F. of 44.0 SUS; viscosity at 100°F. of 155 SUS. and pour point of 0°F. to which had been added a detergent-inhibitor combination comprising on a weight basis a mixture of: 2% polyisobutylene succinic anhydride-tetraethylene pentamine condensation product; 0.3% phosphosulfurized terpene; 0.3% zinc dialkyl dithiophosphate; 0.3% naphthylamine and a slicone antifomant. The results obtained are given in Tables II and III.

TABLE II

| Test/Polymer | LMOT at 300°F. Comm. Prod. No. 1[d] | Comm. Prod. No. 2[b] | Prod. of Exp. No. 2 | Prod. of Exp. No. 9 |
|---|---|---|---|---|
| Polymer Conc. Wt. % | 1.2 | 5.0 | 2.0 | 2.0 |
| Break Time-Days[a] | 7 | 5 | 5 | 7 |
| TAN[d] | 1.5 | 6.0 | 4.9 | 2.8 |
| Sludge Rating | None | Hvy. Haze | Trace | Trace |
| Varnish | None | None | None | None |

TABLE III

| Test/Polymer | LMOT at 325°F. Comm. Prod. No. 1[d] | Prod. of Exp. No. 9 |
|---|---|---|
| Polymer Concn. Wt. % | 1.2 | 2.0 |
| Break Time-Days[c] | 5 | 3 |
| TAN[d] | 6.9 | 7.8 |
| Sludge Rating | Light | Haze |
| Varnish | None | Slight |

Notes to Tables II and III
[a]Commercial Product 1 is a random copolymer consisting of a major proportion of $C_{10}$ to $C_{20}$ alkyl methacrylate monomers and a minor proportion of a nitrogen-containing monomer copolymerized with the aid of a free radical catalyst. It has a nitrogen content of 0.2 wt. % and a weight average molecular weight in the range of 100,000 and 200,000.
[b]Commercial Product 2 is an oil-soluble polymer of polyisobutylene having a number average molecular weight of about 60,000 which is widely used as a V.I. improver.
[c]Break Time is the time in days when a drop of the oxidized oil placed on a dense white blotter having a thickness of 0.025 inches "breaks through" to the opposite side.
[d]TAN is the total acid number of the oxidized oil at the termination of the test.

It will be noted that the product of this invention gave superior results to Commercial Product 2 and the styrene-α-olefin copolymer of the prior art, and was about comparable to Commercial Product No. 1.

Experiment 12 - Two blends were prepared for storage tests at elevated temperature in order to compare the compatibility of the products of the instant invention, and the products of the prior art, with Commercial Product No. 3.

Commercial Product 3 is an oil-soluble, partially crystalline copolymer of ethylene and propylene containing 75 wt. % of ethylene; a crystalline content of about 5 wt. %; a weight average molecular weight of about 80,000 and a number average molecular weight of about 40,000, made by a hydrogen moderated Ziegler-natta synthesis. Each blend contained 10% by wt. of Commercial Product No. 3, to which was added in the one case, 1% by wt. of Experimental Product No. 9 and in the other 1% by wt. of Experimental Product No. 2. Both samples were stored at 140°F. and periodically examined for homogeneity. Layer formation with precipitation of product occurred with the Experimental Product No. 2 in less than a week, whereas no evidence of separation was visible with Experimental Product No. 9 after 2 months.

Consideration of the above data shows a distinct advance for the product of this invention over the products of the prior art. The inclusion of from 1 to 49 mol. percent of $C_2$ to $C_8$ olefin in the polymer and a lower molecular weight, increased solubility and compatibility with higher molecular weight polymers having a high ethylene content and significant degree of crystallinity, and also gave a low pour point when added to oils and an improved resistance to oxidation.

It will be evident from Experiments 11 and 12 that the products of this invention may be compounded in lubricants with other viscosity index improvers, antioxidants, dispersants, oiliness agents, antiwear agents, antifoamants and the like, familiar to those having skill in the lubricant art, without departing from the spirit of this invention.

The polymers of the invention can be used in mineral lubricating oils, and also in synthetic oils to thereby form automotive crankcase lubricants, aircraft engine lubricants, gear oils, transmission fluids, etc. The mineral lubricating oils can be of any usual type, including those derived from the ordinary paraffinic, naphthenic, asphaltic, or mixed base mineral crude oils by suitable refining methods. Suitable synthetic lubricating oils include synthetic hydrocarbon lubricating oils, as well as dibasic acid esters such as di-2-ethyl hexyl sebacate, carbonate esters, phosphate esters, halogenated hydrocarbons, polysilicones, polyglycols, glycol esters such as $C_{13}$ oxo acid diesters of tetraethylene glycol, and complex esters, as for example the complex ester formed by the reaction of 1 mole of sebacic acid with 2 moles of tetraethylene glycol and 2 moles of 2-ethyl hexanoic acid.

While the lubricant compositions herein described are primarily designed as internal combustion engine crankcase lubricants, the additives of the invention may also be employed in other oil compositions, including turbine oils, various industrial oils, gear oils, hydraulic fluids, transmission fluids and the like.

Concentrate comprising a minor proportion, e.g. 5 to 50 wt. % of the polymer in a major amount of oil, e.g. 95 to 50 wt. % oil, preferably a lubricating oil as mentioned above, e.g. mineral lubricating oil, with or without other additives present, can also be prepared for ease of handling.

What is claimed is:

1. V.I. improving and pour depressing oil soluble, substantially amorphous terpolymer having a degree of crystallinity of less than 25 %, an intrinsic viscosity of about 0.24 to about 0.35 when measured at 210°F in a solvent extracted neutral mineral lubricating oil having a viscosity of about 6.2 cs. at 210°F, consisting of 5 to 45 mole percent of styrene, about 5 to 40 mole percent of a lower straight chain alpha-olefin selected from the group consisting of ethylene, propylene, butene-1, pentene-1 and hexene-1, and 20 to 80 mole percent of a $C_{12}$ to $C_{20}$ substantially linear alpha-olefin having not less than nine unsubstituted methylene radicals in a straight chain following the olefinic carbon atoms, said terpolymer being prepared by a Ziegler-Natta synthesis.

2. A terpolymer according to claim 1, wherein said terpolymer is made by a hydrogen moderated Ziegler-Natta synthesis from styrene, hexene-1 and tetradecene-1.

* * * * *

UNITED STATES PATENT OFFICE
CERTIFICATE OF CORRECTION

PATENT NO. : 3,920,622

DATED : November 18, 1975

INVENTOR(S) : Won R. Song and Norman Jacobson

It is certified that error appears in the above–identified patent and that said Letters Patent are hereby corrected as shown below:

In columns 5 and 6, in Table I, the headings in lines 2 to 5 should be replaced by the headings shown in columns 3 and 4, lines 67-69; in Columns 5 and 6, in Tables II and III, after "Comm. Prod. No. 1" change footnote "(d)" to read --(a)--; in Table II after "Break Time-Days" change footnote "(a)" to --(c)--.

Signed and Sealed this twenty-fifth Day of May 1976

[SEAL]

Attest:

RUTH C. MASON
Attesting Officer

C. MARSHALL DANN
Commissioner of Patents and Trademarks